United States Patent
Mădar

[11] Patent Number: 6,165,349
[45] Date of Patent: Dec. 26, 2000

[54] PROCESS FOR THERMAL AND/OR CATALYTIC DECOMPOSITION AND/OR DEPOLYMERIZATION OF LOW-GRADE ORGANIC SUBSTANCES AND DEVICE FOR CARRYING OUT THE PROCESS

[76] Inventor: Ivan Mădar, Rajecká 36, 821 07, Bratislava, Slovakia

[21] Appl. No.: 09/319,131
[22] PCT Filed: Jul. 4, 1997
[86] PCT No.: PCT/SK97/00006
§ 371 Date: Jun. 1, 1999
§ 102(e) Date: Jun. 1, 1999
[87] PCT Pub. No.: WO98/39368
PCT Pub. Date: Sep. 11, 1998

[30] Foreign Application Priority Data
Mar. 3, 1997 [SK] Slovakia ..................... 282-97

[51] Int. Cl.⁷ ............ C10B 55/00; C10G 11/04
[52] U.S. Cl. ............ 208/55; 208/109; 208/118
[58] Field of Search ............ 208/109, 55, 118, 208/119, 120, 120.01

[56] References Cited

U.S. PATENT DOCUMENTS 4,300,997  11/1981  Meguerian et al. ............ 208/120
4,389,376  6/1983  Kojima et al. .
5,840,178  11/1998  Huang et al. ............ 208/253

*Primary Examiner*—Chester T. Barry
*Attorney, Agent, or Firm*—Haverstock, Garrett and Roberts LLP

[57] ABSTRACT

The nature of the process consists in that the low-grade organic substances are subject, at a temperature of 150° C. to 700° C. and at a pressure of 0.1 MPa to 2.5 MPa, to the action of a moving bed of solid particles of a substance which perform whirling motion, whereby the solid particles of a substance constituting the moving bed are set to whirling motion by intensive agitation.

The device consists of a reaction chamber (1) with a rotation mechanism (2) which rotation mechanism (2), located rotably in the faces of the reaction chamber (1), consists of a shaft (3) to which vanes (5) are symetrically attached by means of driving discs (4). The vanes (5) may be arranged in 3 to 10 rows, and they may be provided with openings (5.1) or cut-outs (5.2) of various geometrical shapes, and they may be divided into individual segments (5.3). Also the driving discs (4) may be provided with openings (4.1) of various geometrical shapes.

20 Claims, 3 Drawing Sheets

Fg. 7 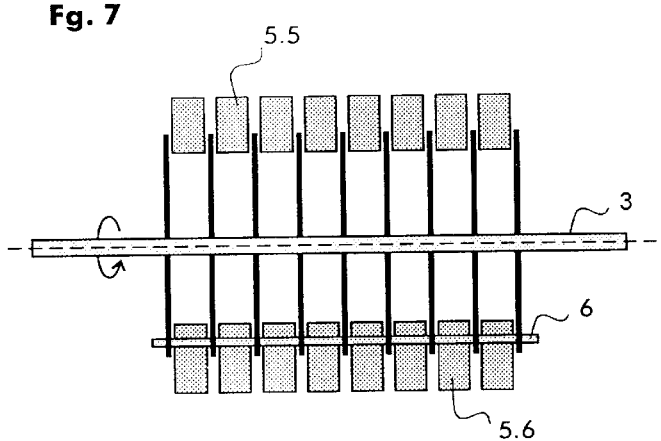

PROCESS FOR THERMAL AND/OR CATALYTIC DECOMPOSITION AND/OR DEPOLYMERIZATION OF LOW-GRADE ORGANIC SUBSTANCES AND DEVICE FOR CARRYING OUT THE PROCESS

TECHNICAL FIELD

Present invention concerns a process for thermal and/or catalytic decomposition and/or depolymerization of low-grade organic substances and a device for carrying out the process.

BACKGROUND ART

Processes and devices for processing organic substances of low economic value which represents their limited utilisation are known, in particular in the field of crude oil processing. Recently, such processes find their application also in utilising, waste as a raw material source.

To the most efficient ways of utilising crude oil heavy fractions belong the decomposition processes which make use of fluidization. The most widespread fluid process for conversion heavy hydrocarbon fractions is the fluidised catalytic cracking process.

Fluidization is defined in technical practice as a state, in which solid particles are in the state of lift by a fluid (gas, liquid), streaming against the field of mass force (gravity), and such a system behaves on the outside like a liquid (suspension). The fluid layer has exceptional properties which are widely utilised in physical and chemical processes . . . . "Intensive motion of particles in the layer and stirring the layer account for high heat and matter transfer and quick balancing of temperature and concentration differences."—V. Míka: Základy chemického inzenyrství (Principles of Chemical Engineering), SNTL/ALFA 1981. The key to the exceptional properties of the fluid layer, utilised in chemical processes, consists in intensive stirring of solid particles by the fluidizing medium.

The problem of elimination of non-uniformities forming in the fluidizing bed is solved in the patent JA-A-05277354, where the fluidizing bed is formed by the fluidizing medium, in which bed particle agglomeration is prevented by using a stirrer in a circular reactor, wherein the motor driven stirrer rotates in the fluidizing bed. medium, in which bed particle agglomeration is prevented by using a stirrer in a circular reactor, wherein the motor driven stirrer rotates in the fluidizing bed.

JP-A-58223435 describes a fluidized bed reactor working with gas as the fluidizing medium in which a stirrer is located to prevent agglomeration of particles of the fluidized catalyst and deposition of the reaction products at the inner wall of the reactor.

Besides classical raw material sources for conversion processes in petrochemistry alternatives are intensively searched for waste utilisation, especially of waste plastic materials, to produce high-grade hydrocarbons.

EP-A1-0502618 describes conversion of plastics, in particular polyolefines, by gasifying them in a fluidizing bed of solid inert particles with a fluidizing gas at temperatures of 300° C. to 690° C.

EP-A1-0687692 describes thermal cracking of chlorinated plastics in a fluidizing bed, consisting of inert particles fluidized by a liquid, with subsequent absorption of chlorine compounds in a solid bed with calcium oxide.

FR-A-2613721 describes a process of synthetic waxes production by thermal decomposition of polyethylene and polypropylene at a temperature of 360° C. to 500° C., wherein the polyolefins are injected into a heated steel tube in the presence of water vapour.

U.S. Pat. No. 3,901,951 describes a method of waste polymer processing: In the first step the polymers are melted at a temperature below 250° C., and in the next step the melt is injected into a thermal medium of fluidized solid particles at a temperature of 350° C. to 550° C. for pyrolysis. Gaseous products of the pyrolysis condense, whereby a mixture of liquid hydrocarbons is obtained. The solid particles may be fluidized using gases like air, nitrogen or water vapour, air being preferred.

Systems working with fluidization, especially chemical reactors, require very high capital expenditures. The lift of solid particles in a fluidized solid reactor is ensured by a streaming gas in most cases. The operations necessary for preparation of the fluidizing medium: compression or pumping of the liquid (gas), its heating, transport, distribution in the reactor, etc., as well as separation of the fluidizing medium from the reaction products, cooling, elimination of losses, etc., cause that the systems operating with the fluidizing bed are technically and, therefore, also economically (as concerns investments and operation) very demanding. The devices are complicated what is caused by the technically complicated maintenance of optimum reaction conditions. The fluidized solid reactors are economically justified only in the case of high performance which again makes an impact on the investment costs.

Moreover, fluidization is often accompanied with non-uniformity. Forming of non-uniformities, i.e. forming of bubbles, channels and pistons may cause breakdown of the processes running in the fluidizing bed, thus reducing the advantages of fluidization considerably.

DISCLOSURE OF INVENTION

The disadvantages of present methods of processing low-grade organic substances are eliminated to a great extent by the process according to the present invention, the nature of which consists in that the low-grade organic substances are subject, at a temperature of 150° C. to 700° C., preferably of 250° C. to 500° C., and at a pressure of 0.1 MPa to 2.5 MPa, preferably of 0.2 to 1.1 MPa, to the action of a moving bed of solid particles which perform whirling motion, whereby the solid particles of a substance constituting the moving bed are set in whirling motion by intensive stirring.

The moving bed of solid particles of a substance may be formed, partially or fully, of a substance which acts at the reaction conditions catalytically on the running chemical reactions or it may be a substance which is inert at the reaction conditions to present reacting substances, such as granular quartz and/or silica sand and/or aluminosilicates and/or other natural and/or synthetic minerals, containing silicon and/or aluminium and/or calcium and/or sodium and/or potassium and/or oxygen and/or sulphur, or a solid absorbent may be added, such as calcium oxide and/or calcium carbonate and/or calcium hydroxide and/or sodium hydroxide.

Diameter of the solid particles constituting the whirling moving bed is $3 \times 10^{-5}$ to $3 \times 10^{-2}$ m, preferably $3 \times 10^{-4}$ to $3 \times 10^{-3}$ m.

The low-grade organic substances and/or solid particles constituting the moving bed may be properly preheated to a temperature of 100 to 450° C., preferably 150 to 350° C.

The low-grade organic substances may be subjected to the action of the moving bed of solid particles of a substance in the presence of water or water vapour and/or in the presence of hydrogen or of a substance releasing hydrogen at the reaction conditions and/or in the presence of ammonia, wherein besides the reaction medium for cleaving and subsequent chemical reactions the whirling moving solid particles of a substance form also the heat exchange surface of a whirling separating (drying) bed in which change of the state of matter takes place of present liquids which are inert at the reaction conditions.

As low-grade organic substances in particular following substances may be used: crude oil or tar hydrocarbons having higher molecular weight and/or macromolecular substances, mainly plastics and elastomers, waste macromolecular substances, mainly waste plastics and elastomers, and/or waste hydrocarbon oils, mainly waste lubricating, engine and/or gear and/or turbine and/or machine and/or hydraulic and/or transformer and/or machining and/or heat-transfer oils, heavy crude oil and/or heavy crude oil hydrocarbons and/or tar hydrocarbons and/or natural and/or refinery asphalts and bitumens and/or atmospheric and/or vacuum residues of distillation processes from processing and refining crude oil and/or coal tar naphtha, further natural rocks, containing organic substances, especially hydrocarbons, mainly oil and bitumen sands and shales, further waste, containing organic substances, mainly crude oil hydrocarbons and/or tar hydrocarbons and/or macromolecular substances/plastics and elastomers and/or waxes and/or resins and/or polysacharides.

The nature of a device for carrying out the process according to the present invention, comprising a cylindrical reaction chamber with a rotation mechanism, ensuring intensive whirling motion, inlet openings for the reacting substances, and outlet openings for the reaction products, consists in that the rotation mechanism, located rotably in the faces of the reaction chamber, consists of a shaft to which vanes are symetrically attached by means of driving discs, while the rotation mechanism is oriented coaxially with the axis of the reaction chamber, and the peripheral speed of the vanes lies in the range of 15 to 135 $ms^{-1}$, preferably of 35 to 85 $ms^{-1}$. The vanes may be attached to the driving discs either rigidly or swingingly.

The vanes, attached to the shaft by means of driving discs, may be arranged in 3 to 10 rows, parallel to the shaft axis, and they may have openings or cuts of various geometrical shapes, or they may be divided into separate segments with eliptic openings or with openings of a different geometrical shape. Also the driving discs may have holes of various geometrical shapes.

A part of the rotation mechanism, located in the reaction chamber, is separated from the surrounding exterior by a sealing system, ensuring the tightness of the reaction chamber. The material inlet openings into the reaction chamber are situated in its face, the outlet opening for gaseous reaction products is in the opposite face, as near as possible to the axis of the rotational motion, where is the lowest concentration of solid particles in the liquid or gas. The outlet opening for solid particles is located in the cylindrical part of the reaction chamber jacket, near its face having the outlet opening for gaseous reaction products.

The nature of the process according to the present invention consists in that the moving bed is formed by intensive stirring of solid particles which perform forced whirling motion in a cylindrical reaction chamber, and in the utilisation of the hot whirling bed of solid particles as a medium for chemical reactions, mainly for thermolysis-thermal decomposition of low-grade organic substances. In the whirling moving bed intensive circulation of solid particles occurs, whereby a medium with ideal stirring is formed, enabling us to utilise the whirling moving bed in a chemical reactor to create isothermal conditions. Turbulent motion of reacting substances contributes to the enhancement of the whirling motion of solid particles which are in a lift state, while the reacting substances at the reaction temperatures are mainly in the liquid or gaseous state of matter.

Before entering the reaction chamber the solid particles may be preheated, thus representing an inert carrier of heat, necessary for the execution of chemical and other processes. Simultaneously, the solid particles in the whirling bed form directly in the reaction chamber a heat-transmission surface of an energy exchanger having a great surface area and, consequently, a high speed of heat exchange. The great surface area of the heat-transmission surface, formed by whirling solid particles, and high thermal conductivity of the whirling bed allow intensive course of heterogeneous reactions in the reaction chamber with a whirling moving bed of solid particles.

The whirling moving bed may be, partially or fully, formed of particles of a solid substance which exhibits catalytic activity in chemical reactions running in the reactor. In this way the whirling bed formes a medium suitable for the course of heterogeneous catalytic reactions. It is possible to use such a bed for simple thermal decomposition. A cationic (acidobasic) heterogeneous catalyst, for example an aluminosilicate, assists breaking of —C—C— bonds, and makes thermal decomposition running in the whirling moving bed more effective.

A preferred variant consists in utilising a whirling bed of solid particles for catalysed thermolysis of organic substances, using a heterogeneous bifunctional catalyst. A redox and cationic catalyst, forming a whirling bed, for example cobalt and molybdenum oxides on an acidic carrier (aluminosilicate) in the presence of hydrogen or of a hydrogen releasing compound (hydrazine) makes possible to increase the reaction rates of all chemical processes—cleaving and hydrogenation, to reduce reaction temperatures, and to eliminate undesirable side reactions. Owing to the great surface area formed by the solid particles, and owing to the intensive agitation of the catalyst bed the transport processes of catalysis are fast and, therefore, the diffusion properties of the system are favourable, thus increasing the reaction rate of the catalysed reactions. This fact brings several preferred consequences.

The whirling moving bed may be formed of solid particles of a substance which is inert, at reaction conditions, to present reacting substances, for example granular quartz or silica sand or mineral substances.

To remove acidic compounds, mainly chlorine and sulphur compounds, from the mixture of reaction products an absorbent may be added as a component of the whirling bed of solid particles, by means of which the solid substance is able to bind chemically. at reaction conditions, acidic compounds, for example calcium oxide, calcium carbonate, calcium hydroxide or sodium hydroxide. In this way the whirling moving bed acts as an absorption bed, simultaneously preserving all other functions. In this way it is possible to remove also other undesired components from the mixture of reaction products by absorption directly in the cleaving reactor.

It is known that decomposition thermal processes which are characterised by an increase of the number of moles in the system, e.g. thermolysis of hydrocarbons, are supported by the presence of a diluting agent. Preferably, this fact may be used also for thermal decomposition of organic substances in the whirling bed. As a diluent agent water or water vapour or hydrogen or ammonia may be used. The diluent agent may also take part in desired chemical reactions. In the case where the whirling bed is formed partially of a solid substance having catalytic redox properties (e.g. of cobalt and molybdenum oxides), present diluent agent, especially hydrogen, will enter reactions with products of cleaving processes, and hydrogenations will take place directly in the decomposition reactor.

The great amount of particles of a solid substance having small dimensions and performing an intensive whirling motion in the bed acts by mechanical interactions on the liquids, present in the reactor, and causes mechanical disintegration—dispersion of the liquids, whereby the atomised liquid together with present gases form an aerodispersion system—a fog which behaves like a gas. The whirling bed of solid particles acts as a dispersing bed for liquids. This is of practical value for the choice of temperature conditions for reactions with chemical change of the structure of substances. Reaction temperatures may be lower and cleaving may take place in a gaseous as well as in a liquid phase. As a result of the above mentioned effect the reaction products form a single phase—an aerodisperse fog (an aerosol liquid-gas) which leaves the reaction chamber in the form of a gas.

The energy, necessary for carrying out the processes in the whirling bed, is supplied in the form of heat. A special feature of the present invention is the way of energy transport and transformation. A part of the thermal energy, necessary for carrying out the processes taking place in the reaction chamber is generated directly in the reaction chamber by conversion of the kinetic energy of the rotation mechanism into thermal energy as a result of mechanical actions between the active parts of the rotation mechanism and solid particles of the moving bed, as well as mutual mechanical interactions of the solid particles forming the whirling moving bed, and friction between the solid particles of the whirling moving bed and stationary parts of the reaction chamber. Transformation of the kinetic energy of the rotation mechanism into thermal energy directly in the reaction chamber, i.e. in the place of energy consumption, is one of the reasons of high energetic efficiency of the device with the whirling bed of solid particles. A part of the thermal energy, necessary for carrying out the processes in the reaction chamber with a whirling bed, is supplied also by means of a heat-transfer medium, wherein the heat-transfer medium consists of preheated solid particles forming the whirling moving bed or preheated organic substances entering the reaction chamber. The fact that the energy is consumed in the place of heat exchange contributes to high energetic efficiency of the system with the whirling bed of solid particles.

Present invention concerns also a device in which reaction medium with high intensity of momentum, heat and substance transfer exists, formed by a moving bed of solid particles which perform fast whirling movement, whereby the main source of momentum of solid particles of the whirling moving bed and of reacting substances is a fast rotating rotation mechanism, located in the reaction chamber.

The vanes attached to driving discs constitute an important structural element of the reaction chamber. The level of turbulence in the reaction chamber and whirling motion of solid particles of the bed which are the essential characteristics of the whole system, depend on the vanes. The vanes must be made of special abrasion resistant, for example composite or ceramic, materials or of a high-quality alloy steel with tungsten. As a result of the abrasive action of solid particles of the whirling bed the vanes are subject to attrition, and their regular exchange belongs to standard maintenance of the device. Division of the vanes into segments brings advantages in the manufacture of the rotation mechanism but especially in the maintenance of the chemical reaction chamber with the whirling bed of solid particles. Gaps between the segments form holes which support the turbulence or single segments may have, for example eliptic, openings to increase the turbulency.

Openings in the driving disc allow the reaction products to stream near the axis of the rotational motion, i.e. outside the whirling bed, thus allowing reduction of the fly loss of solid particles with very small dimensions in the outgoing reaction gas.

A reaction chamber with whirling moving bed of solid particles can be used to adjust dimensions of the solid particles creating the whirling bed, simultaneously preserving its all other functions, properties and characteristics. The vanes or rows of vanes of especially rugged construction act by impacts and friction on larger particles than those forming the whirling bed, in a way similar to the action of hammers in a hammer mill on the substance being ground, and cause their mechanical disintegration—grinding. In this way particles of the whirling moving bed of suitable grain fineness are formed by grinding the entering solid substance directly in the reaction chamber. The vane construction is adapted to its special function and higher mechanical stress. The vanes acting like hammers of a hammer mill, but arranged in rows, may be attached to the driving discs either by fixed attachments or by attachments allowing their swinging motion.

It is characteristic for the reaction medium according to the present invention that the source of momentum of solid particles forming the whirling moving bed is a rotation mechanism, located in the reaction chamber. The solid particles and the whirling moving bed formed of the solid particles fulfill or can fulfill in the chemical reactor several functions: they act as a heat-transfer medium, heat-exchanger, heat source, properties homogenizer, isothermal medium, dispersing bed for liquids, catalyst bed, absorption bed and separation (drying) bed. Diameter of the solid particles is small, mainly of $3.10^{-4}$ to $3.10^{-2}$ m, so that the particles have relatively high specific surface on which intensive exchange of energy and mass takes place.

The present invention is based on the idea of creating a reaction medium with physical and physico-chemical properties similar to those which are characteristic for the reaction medium with a fluid layer, but with a different—simpler—way of creating the medium, and with a different design of the device in which the medium is created. Contrary to the chemical reactor with a fluidizing bed the device according to the present invention is characterised by that the lift of the solid particles forming the reaction medium—a whirling moving bed—does not arise by streaming of a fluid through a set of particles on which gravity is acting but it arises as a result of intensive rotational motion of an agitating device, located directly in the reaction chamber. A source of momentum of the fluidizing medium (a pump, a compressor) is located in the system with a fluidizing bed outside the reactor, but in the system according to the present invention the source of momentum of the whirling motion is located directly in the reactor.

The arising products of decomposition and subsequent chemical processes are valuable, according to the choice of reaction conditions saturated or unsaturated hydrocarbons, distilling mainly in the range of 10° C. to 550° C.

The present invention provides an effective way of processing low-grade and waste organic substances or materials containing organic substances in a mixture with inert components. Further it makes possible to process hitherto hardly utilizable materials with favourable economic effect, whereby these become an interesting raw material source.

The whirling moving bed formed according to the present invention has several favourable physico-chemical properties, the advantageous ones being mainly the high speed of transfer of momentum, heat and mass, and fast equalisation of temperature and concentration differences. The processes taking place in the whirling bed of solid particles are characterised by high energetic efficiency.

A further advantage of the whirling bed of solid particles formed according to the present invention is the absence of non-uniformities. The rotation mechanism creating the whirling moving bed of solid particles homogenizes by intensive rotational motion the reaction substances present in the reaction chamber and it does not allow forming of bubbles, channels, pistons and other non-uniformities. A reaction chamber with the whirling bed of solid particles exhibits a favourable ratio of performance to the size of the device, thus enabling us to reach remarkable production performance with a relatively small technological equipment.

In a reaction chamber with the whirling bed of a heterogeneous catalyst it is possible to work at a lower temperature or with a less amount of the catalyst, compared with conventional methods, or it is possible to use less active and, therefore, a cheaper catalyst.

Construction of a device in which a whirling bed of solid particles according to the present invention is forming is simple, whereby also economically preferred.

A special preferred feature of the invention consists in the flexibility of the processes in the whirling bed, concerning the physical state and chemical composition of the processed material. In a single technological equipment it is possible to use as a raw material materials with different compositions of organic substances, either liquid or solid, but also mixtures of organic substances with inorganic solid parts and water.

BRIEF DESCRIPTION OF FIGURES ON THE DRAWINGS

FIGS. 7 and 8 show a rotation mechanism with vanes, firmly and swingingly attached to the driving discs.

EXAMPLES OF EMBODIMENTS OF THE PRESENT INVENTION

Example 1

Figure 1:
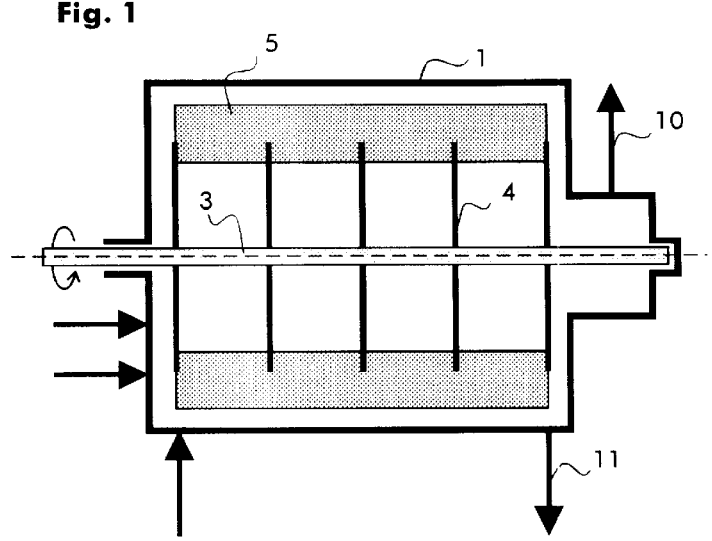
FIGS. 1 and 2 show the basic construction of the device according to the present invention—the reaction chamber.
Figure 2:
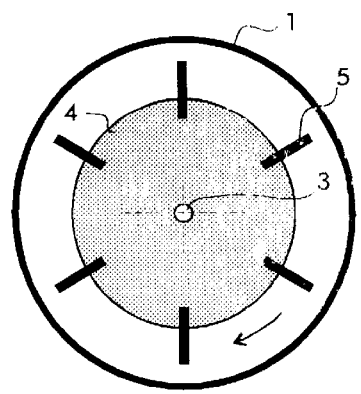
Figure 3:
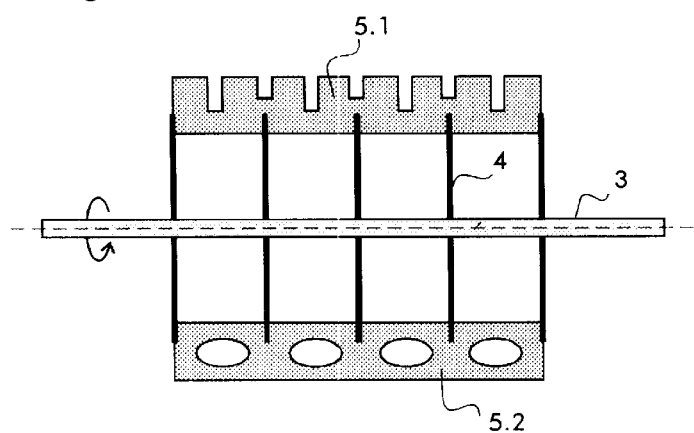
FIG. 3 shows a design solution of a rotation mechanism with vanes provided with openings of a rectangular shape and with eliptical cut-outs.
Figure 4:
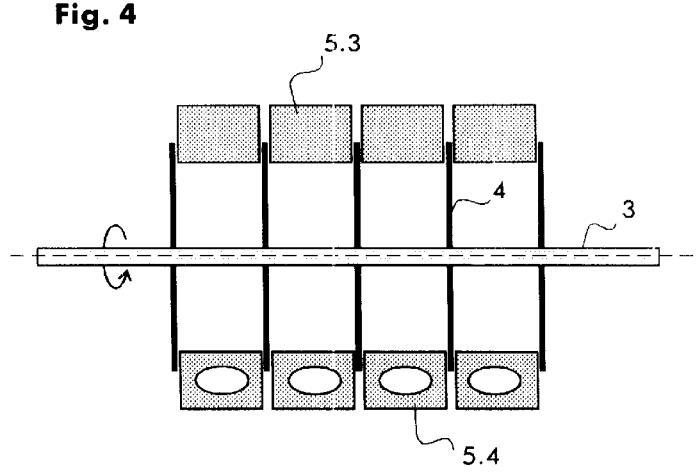
FIG. 4 shows a rotation mechanism with the vanes divided into separate segments.
Figure 5:
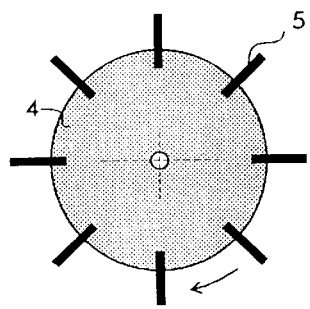
FIG. 5 shows a driving disc of the rotation mechanism having eight vanes.
Figure 6:
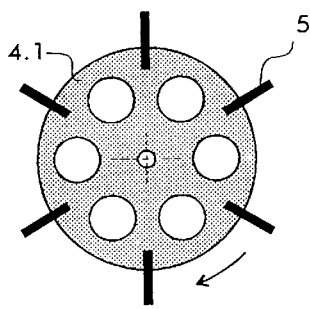
FIG. 6 shows a driving disc of the rotation mechanism having openings.
Figure 8:
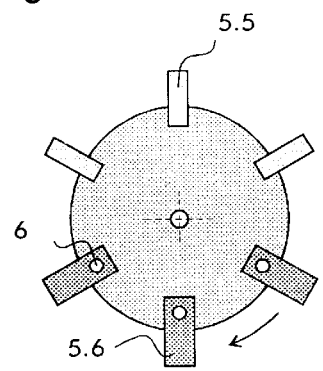

A device for thermal and/or catalytic decomposition and/or depolymerization of low-grade organic substances according to FIGS. 1 and 2 consists of a cylindrical reaction chamber 1 with a rotation mechanism, ensuring intensive whirling motion, inlet openings for the solid particles which form the whirling moving bed, inlet openings for the reacting substances, and outlet openings for the reaction products. The rotation mechanism rotably located in the faces of the reaction chamber 1, and it consists of a shaft 3 to which vanes 5 are symetrically attached by means of driving discs 4, while the rotation mechanism is oriented coaxially with the axis of the reaction chamber 1.

Figure 9:
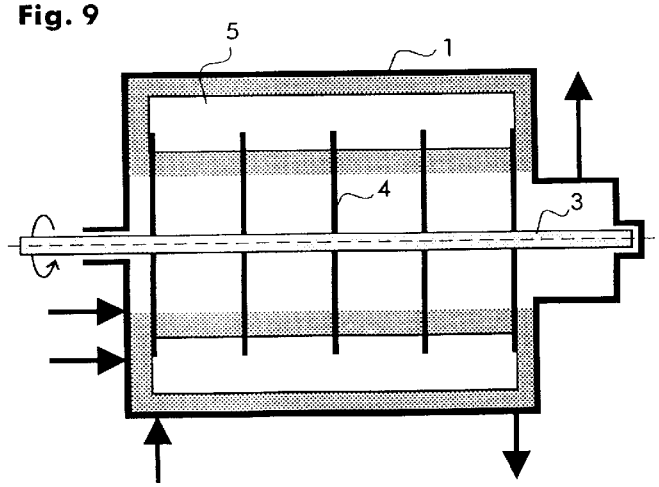
FIGS. 9 and 10 represent the principle of forming a moving bed of solid particles, performing an intensive whirling motion.
Figure 10:
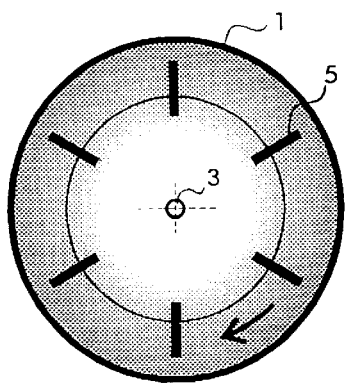

The principle of creating a moving bed of solid particles which perform intensive whirling motion is apparent from FIGS. 9, 10. Silica sand, preheated in the heat-exchanger 9 to a temperature of 150° C., is supplied to the reaction chamber 1 through the inlet opening for solid particles. Simultaneously waste lubricating oil is fed, preheated in the heat-exchanger 9' to a temperature of 60° C. After bringing the rotation mechanism 2 into motion the vanes 5, attached to the driving discs 4, perform a circular motion with the peripheral speed of 55 ms$^{-1}$. During the circular motion the vanes 5, made of an alloy steel with tungsten, act by their own momentum on the solid particles in the reaction chamber 1, forcing the solid particles, present in the reaction chamber 1, into a whirling motion. At the above given speed of the vanes 5 gravity, acting on the solid particles, is negligible in comparison with the centrifugal force and, therefore, the solid particles form a whirling moving bed of an annular shape (a ring) between the inner wall and the axis of the reaction chamber 1. The vanes 5 set into a whirling motion also the remaining present substances, especially liquids, which take part in physical and chemical processes, being in progress, or they are products of the processes. These whirling liquids act by their own momentum on the present solid particles, thereby increasing the turbulency of the whirling moving bed of solid particles which are kept in the form of a suspension together with liquids present in the reaction chamber 1.

Example 2

In a pilot plant with a reaction chamber 1 having the inner diameter of 0.4 m and a rotation mechanism 2 driven by the motor 7 with the power consumption of 15 kW a whirling moving bed has been created the solid particles of which consisted of a common silica sand, heated to 450° C. The peripheral speed of the vanes 5 was 60 ms$^{-1}$. Into the reaction chamber 1 at these conditions a preheated mixture of waste engine oil and plastics—polyethylene and polypropylene was injected by means of a screw pump. The weight ratio of the components was 60% of the waste engine oil, 20% of polyethylene and 20% of polypropylene. Quality of the oil and plastics is specified in Table 1. Simultaneously water vapour in the amount of 5 weight % of the whole feed was added into the reaction chamber 1 as a diluting medium. New plastics have been used in the form of granules of the approximate dimensions 4×3×3 mm. In the reaction chamber 1 with the whirling moving bed decomposition and depolymerization reactions of injected hydrocarbons and plastics took place at a temperature of 520° C. and a pressure of 0.15 MPa. The gaseous reaction products were intensively cooled in a baffle tray condenser. Cool water has been used as cooling medium. The liquid product, a condensate, has been gravitationally separated into single components, i.e. water and hydrocarbons. No formation of water/oil emulsion has been observed during the phase separation. The liquid raw materials and products have been analysed by standard procedures, used in the oil analysis. The quality and properties of the product are given in Tables II and III.

TABLE I

Quality of waste engine oil and plastics

| Parameter | Unit | Value |
| --- | --- | --- |
| Density at 20° C. | kg m$^{-3}$ | 895 |
| Viscosity at 20° C. | mm$^2$s$^{-1}$ | 39 |
| Content of mechanical impurities | weight % | 3,6 |
| Water content | weight % | 5,5 |
| Ash content | weight % | 0,25 |

Polyethylene used: low-pressure LDPE—type BRALEN RB 03-23
Polypropylene used: catalytic PP—type TATREN ME 311

The liquid hydrocarbon condensate constituted 96.2 weight % of the whole feed of organic substances. The residue consisted of gases (methane, light hydrocarbons and $CO_2$) which cannot condense at conditions existing in the baffle tray water cooler.

Table II

Quality of the liquid product

| Parameter | Unit | Value |
| --- | --- | --- |
| Density at 20° C. | kgm$^{-3}$ | 846 |
| Viscosity at 20° C. | mm$^2$s$^{-1}$ | 15,2 |
| Content of mechanical impurities | weight % | 0,13 |
| Water content | weight % | 0,05 |
| Ash content | weight % | 0,21 |
| Flash-point, Pensky-Martens | ° C. | 62 |
| Pour point | ° C. | -15 |

TABLE III

Distillation test of the liquid product

| Distilled amount (volume %) | Temperature (° C.) |
| --- | --- |
| Beginning of the distillation | 200 |
| 5 | 226 |
| 10 | 243 |
| 20 | 267 |
| 30 | 295 |
| 40 | 321 |
| 50 | 371 |
| 60 | 415 |
| 70 | 442 |
| 80 | 473 |
| 90 | 510 |
| 95 | 541 |
| End of distillation (98) | 550 |

Example 3

In a pilot plant with a reaction chamber 1 having the inner diameter of 0.4 m and a rotation mechanism 2 driven by the motor 7 with the power consumption of 15 kW a whirling moving bed has been created the solid particles of which consisted of a common preheated to 450° C. The peripheral speed of the vanes 5 of the rotation mechanism 2 was 50 ms$^{-1}$. At these conditions the reaction chamber 1 was fed by a preheated mixture of a distillation residue from an atmospheric distillation of crude oil (heavy heating oil), technical calcium oxide as an absorbent of acidic compounds and contaminated soil from a simulated petroleum accident, i.e. soil containing hydrocarbons. The weight ratio of the components was 55 weight % of the heavy heating oil, 5 weight % of calcium oxide, and 40 weight % of the contaminated soil which contained 6.5 weight % of diesel fuel and approximately 8.5 weight % of water. Quality of the heavy heating oil is given in Table IV.

In the reaction chamber 1 with the whirling moving bed decomposition reactions of injected hydrocarbons, as well as separation of hydrocarbons and water from the solid particles forming the contaminated soil, and chemisorption of sulphur compounds took place at a temperature of 550° C. and a pressure of 0.11 MPa. The gaseous reaction products were subsequently intensively cooled in a baffle tray condenser. Cool water has been used as cooling medium. The raw materials as well as solid, liquid and gaseous reaction products have been analysed by standard analytic procedures.

TABLE IV

Quality of heavy heating oil

| Parameter | Unit | Value |
| --- | --- | --- |
| Density at 20° C. | kg m$^{-3}$ | 990 |
| Viscosity at 100° C. | mm$^2$s$^{-1}$ | 55 |
| Viscosity at 150° C. | mm$^2$s$^{-1}$ | 8 |
| Pour point | ° C. | +38 |
| Sulphur content | weight % | 2,8 |

The liquid hydrocarbon condensate constituted 97.3 weight % of the whole weight of the crude oil substances fed into the reaction chamber 1. The residue consisted of gases (methane, light hydrocarbons and $CO_2$) which cannot condense at the conditions existing in the baffle tray water cooler. Quality of the liquid product is given in Table V.

In the reaction chamber 1 virtually all hydrocarbons have been removed from the contaminated soil, their content having decreased from the original 6.5 weight % to 0.05 weight %, water has been completely removed from the soil.

TABLE V

Quality of the liquid product 2

| Parameter | Unit | Value |
| --- | --- | --- |
| Density at 20° C. | kg m$^{-3}$ | 859 |
| Viscosity at 20° C. | mm$^2$s$^{-1}$ | 17,3 |
| Content of mechanical impurities | weight % | 0,18 |
| Ash content | weight % | 0,33 |
| Water content | weight % | 0,11 |
| Flash-point, Pensky-Martens | ° C. | 74 |
| Pour point | ° C. | -8 |
| Sulphur content | weight % | 0,8 |

The results shown illustrate a high degree of conversion of the chemical structure of substances and a significant change of the molecular weight of organic substances in the course of thermolysis and depolymerization in the reaction medium with hot moving bed of whirling solid particles.

Example 4

In a pilot plant with a reaction chamber 1 having the inner diameter of 0.4 m and a rotation mechanism 2 driven by the motor 7 with the power consumption of 15 kW a whirling moving bed has been created the solid particles of which consisted, at the start up of the process, of a common silica sand, heated to 250° C. The peripheral speed of the vanes 5 was 45 ms$^-$. At these conditions the reaction chamber 1 was fed by a sludge containing oil hydrocarbons from a mechanical step of treating of waste water from an oil refinery (API separator). The sludge has been machine dewatered in a vacuum filter before feeding into the process. The water content in the sludge was 35 weight %, the content of hydrocarbons was 25 weight %, the remainder consisted of insoluble solid substances. In the reactor with the whirling moving bed decomposition reactions of hydrocarbons present in the sludge as well as separation of hydrocarbons and water from the solid particles forming the dewatered sludge took place at a temperature of 350° C. and a pressure of 0.13 MPa. The gaseous reaction products were subsequently intensively cooled in a baffle tray condenser. Cool water has been used as cooling medium. The solid, liquid and gaseous reaction products have been analysed by standard procedures.

The liquid hydrocarbon condensate constituted 96.2 weight % of the whole weight of the crude oil substances fed into the reactor. The residue consisted of gases (methane, light hydrocarbons and $CO_2$) which cannot condense at the conditions existing in the baffle tray water cooler.

Quality of the liquid product is given in Table VI. After the processing in the reactor the solid reaction product— "dry matter" contained 0.13 weight % of hydrocarbons and traces of water.

TABLE VI

Quality of the liquid product 3

| Parameter | Unit | Value |
|---|---|---|
| Density at 20° C. | kg m$^{-3}$ | 830 |
| Viscosity at 20° C. | mm$^2$s$^{-1}$ | 8,5 |
| Content of mechanical impurities | weight % | 0,38 |
| Ash content | weight % | 0,43 |
| Water content | weight % | 0,14 |
| Flash-point, Pensky-Martens | ° C. | 54 |
| Pour point | ° C. | −11 |
| Sulphur content | weight % | 1,2 |

Figure 11:
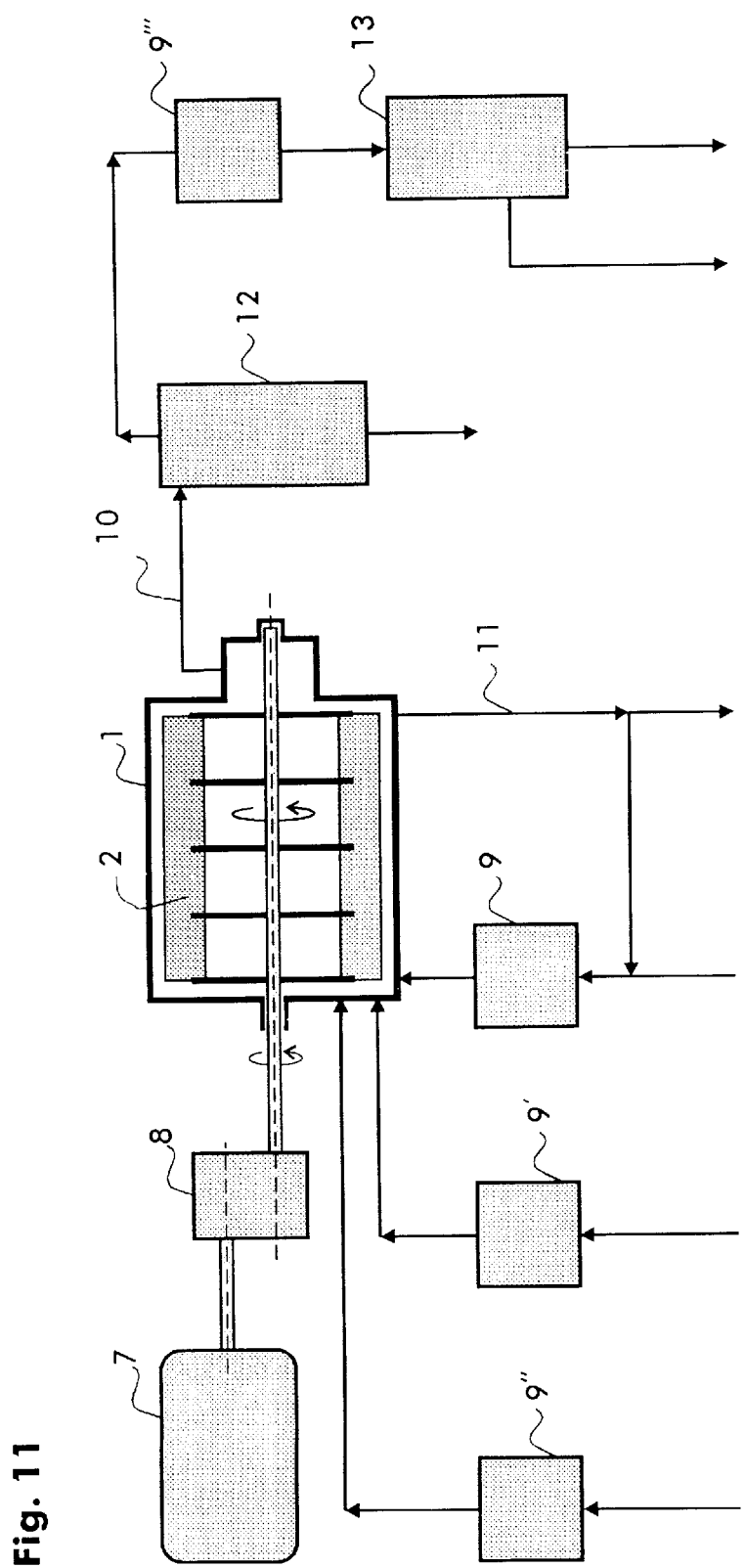
FIG. 11 shows a flow diagram of a technological equipment with an inert whirling bed.

The scheme of a continually working technological unit which uses a whirling bed of solid particles:

The flow diagram of a continually working industrial technological unit having a reaction chamber 1 with a whirling bed of solid particles for processing a mixture of waste lubricating mineral oils and waste plastics and elastomers, shown in FIG. 11, consists of a reaction chamber 1 in which a rotation mechanism 2 is located, consisting of a shaft 3 with the vanes 5 attached to the shaft 3 by means of driving discs 4. Rotational motion of the shaft 3 is ensured by the motor 7 through the gear box 8. By means of the gear box 8 optimum speed of rotation of the shaft 3 is adjusted depending on the choice of reaction conditions. Solid particles forming the whirling bed, in the concrete silica sand with the grain fineness $3.10^{-3}$ m, preheated to a temperature of 250° C. in the heat-exchanger 9, are fed by a screw conveyer into the reaction chamber 1 in which the rotation mechanism 2 is quickly rotating. After creating the whirling bed of solid particles waste lubricating oil, preheated before the feeding to a temperature of 70° C. in the heat-exchanger 9", is continually fed into the reaction chamber 1 by a mohno pump. Subsequently cut pieces of waste polyethylene and polypropylene, also preheated in the heat-exchanger 9', are dosed into the reaction chamber 1 by a screw doser. An integral part of the reaction chamber 1 is the outlet pipe 11 for taking off solid particles directly from the whirling moving bed which return again to the process after warming up in the heat-exchanger 9. In this way optimum reaction temperature is maintained in certain reaction modes. If the whirling bed consists of a catalyst and it is necessary to regenerate the catalyst, the above given procedure makes it possible to take the catalyst from the reaction chamber 1 for regeneration, and to return the activated catalyst back into the process. The outlet pipe 11 makes it possible to remove the excess solid particles from the moving bed in the reaction chamber 1, and simultaneously it may be used to empty the reaction chamber 1 before stopping down the process.

The reaction products of thermolysis, being in the gaseous state and in the state of an aerodisperse fog, are led away through the outlet flange 10 into the dust excluder 12. The stream of gaseous reaction products contains also the finest parts of solid particles, so called fly loss, which must be removed. After removing the fly loss the stream of reaction products, mainly hydrocarbons, is cooled in the heat-exchanger 9", while a part of organic substances condenses. The liquid condensate is separated in the separator 13 from the gaseous parts which may be burned up or further processed. The gaseous and liquid substances, comprising mainly valuable hydrocarbons, are further processed by standard methods used in refinery and petrochemistry plants. As a dust excluder 12 a cyclone or multicyclone, electrostatic separator, rotoclone, shutter dust catcher or other suitable device is used.

INDUSTRIAL APPLICABILITY

The reaction medium formed by the whirling bed of solid particles according to the present invention may be effectively used for all known chemical processes of decomposition of organic substances, especially for thermolysis of high-boiling and waste hydrocarbons, e.g. heavy crude oils, tar, natural asphalts and bitumens, heavy hydrocarbons from the processing earth oil and tar (asphalts, heavy distillation residues and the like). The invention makes it possible to effectively utilize bitumen and oil shales and sands, and with certain limitations also dehydrated biomass, as a raw material.

Hot whirling bed of solid particles may be used also in new applications, first of all for thermolysis of macromolecular substances, mainly waste plastics, preferably polyethylene, polypropylene, polystyrene, PVC and waste elastomers, such as styrene-butadiene copolymers and polybutadiene, which are thus becoming an interesting and inexpensive source of raw materials. The invention also allows effective recycling—utilization—of waste which contains organic substances, first of all used and waste lubricating, hydraulic, transformer, machining, heat-transfer etc. hydrocarbon oils.

The process and device according to the present invention may be also effectively used to process solid, slurry and liquid waste mixtures which contain organic substances, for example dewatered oiled and biological sludges from the waste water treatment plants, slurries from the coal flotation, oil slurries from the recovery of oil and rock gas, waste from the processing of vegetable oils and waxes, contaminated soil and earth from petroleum accidents and disasters and the like.

The objective solution may be effectively used in further standard processes of thermolysis of organic substances, known in petrochemistry, i.e. thermal decomposition processes in the presence of diluting medium—water vapour, hydrogen or an inert gas ($N_2$, $CO_2$), thermal decomposition processes using an acidobasic heterogeneous catalyst, thermal decomposition hydrogenation processes using a redox heterogeneous catalyst.

The decomposition products are used as intermediate products to produce automotive fuel and heating oils and/or as raw materials for further refinery and/or petrochemical processing and/or they are used in power engineering to produce electricity or for heating.

What is claimed is:

1. A process of decomposition of low-grade organic substances, which comprises the steps of:
   (a) introducing a quantity of solid particles into a cylindrical reaction chamber having an axis and an inward facing wall;
   (b) introducing a quantity of low-grade organic substances into said reaction chamber;
   (c) whirling a rotor within said chamber about said axis and adjacent said inward facing wall so as to impact, fluidize and whirl said solid particles and form a whirling bed of said solid particles about said axis by intensive rotational mechanical agitation throughout a major portion of an annular region of said reaction chamber adjacent said wall; and
   (d) intensely agitating said substances, at a temperature within a range of from about 150 to about 700 degrees Centigrade and at a pressure within a range of from about 0.1 MPa to about 2.5 MPa, by contacting said substances with said whirling rotor and intermixing said substances with said whirling, bed of solid particles.

2. A process in accordance with claim 1 wherein said temperature is within a range of from about 250 to about 500 degrees Centigrade.

3. A process in accordance with claim 1 wherein said pressure is within a range of from about 0.2 MPa to about 1.1 MPa.

4. A process in accordance with claim 1 wherein said whirling bed of solid particles comprises particles which acts at the reaction conditions catalytically on the low-grade organic substances.

5. A process in accordance with claim 1, wherein said whirling bed of solid particles consists essentially of particles which are catalytically inert with respect to the low-grade organic substances at the reaction conditions, so that the primary effect of the solid particles on the low-grade substances is transfer of mechanical impact forces.

6. A process in accordance with claim 5 wherein at least a portion of the particles are natural minerals.

7. A process in accordance with claim 5 wherein at least a portion of the particles are synthetic minerals.

8. A process in accordance with claim 5 wherein at least a portion of the particles are selected from the group consisting of granular quartz, silica sand, and aluminosilicates.

9. A method in accordance with claim 1 further comprising the step of preheating the low-grade organic substances to a temperature of 100 to 450 degrees prior to introducing said substances into said reaction chamber.

10. A method in accordance with claim 1 further comprising the step of preheating the solid particles to a temperature of 100 to 450 degrees prior to introducing said particles into said reaction chamber.

11. A method in accordance with claim 1 further comprising the step of subjecting the low-grade organic substances to the whirling fluizided bed of solid particles in the presence of an ingredient from the group consisting of water, water vapor, hydrogen, a hydrogen-releasing compound, and ammonia.

12. A method in accordance with claim 1, wherein the low-grade organic substances are selected from the group consisting essentially of crude oil, tar hydrocarbons, macromolecular substances, plastics, waste oils, asphalts, bitumens, petroleum products, petroleum refining residues, coal tars, organic wastes, vegetable oils, waxes, resins, and polysaccharides.

13. A method in accordance with claim 1 wherein said whirling bed creates a centrifugal forces on said low-grade organic substances to aid in separation of reaction products.

14. A fluidized particle reactor for decomposition of low grade organic substances, comprising:
   a cylindrical reaction chamber having an axis and including an inlet opening for solid particles, an inlet opening for reactants, an outlet opening for solid particles and an outlet opening for reaction products and an inwardly facing wall;
   a rotor disposed coaxially within said chamber and extending along a major portion of a length of said chamber and including a shaft coaxial with said chamber axis, a plurality of vanes extending parallel to said shaft symmetrically alone a major portion of a length of said chamber adjacent said inwardly facing wall, and a plurality of discs spaced along said shaft and attached to both said shaft and said vanes.

15. A rector in accordance with claim 14 wherein said vanes are disposed in 3 to 10 row parallel to said axis of said reaction chamber.

16. A rector in accordance with claim 14 wherein said vanes include a passageway of geometrical shape.

17. A rector in accordance with claim 14 wherein said discs include a passageway of geometrical shape.

18. A rector in accordance with claim 14 wherein said vanes are divided into segments, and a segment includes a passageway of oval shape.

19. A rector in accordance with claim 14 wherein said vane are attached rigidly to said discs.

20. A reactor in accordance with claim 14 further wherein said vanes are non-rigidly attached to said discs.

* * * * *